US009743572B2

(12) United States Patent
Martin (10) Patent No.: US 9,743,572 B2
(45) Date of Patent: *Aug. 29, 2017

(54) ADJUSTABLE ROW CLEANER (71) Applicant: Ronald S. Martin, Mt Dora, FL (US)

(72) Inventor: Ronald S. Martin, Mt Dora, FL (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/312,262

(22) Filed: Jun. 23, 2014

(65) Prior Publication Data

US 2014/0299341 A1    Oct. 9, 2014

Related U.S. Application Data (63) Continuation of application No. 12/955,366, filed on Nov. 29, 2010, now Pat. No. 8,794,165, which is a continuation of application No. 12/480,662, filed on Jun. 8, 2009, now Pat. No. 7,861,660.

(60) Provisional application No. 61/135,876, filed on Jul. 24, 2008, provisional application No. 61/131,192, filed on Jun. 6, 2008.

(51) Int. Cl.
| A01B 63/00 | (2006.01) |
| A01C 5/06 | (2006.01) |
| A01C 7/00 | (2006.01) |
| A01C 7/20 | (2006.01) |

(52) U.S. Cl.
CPC ........... *A01B 63/008* (2013.01); *A01C 5/06* (2013.01); *A01C 5/064* (2013.01); *A01C 5/066* (2013.01); *A01C 7/006* (2013.01); *A01C 7/203* (2013.01); *A01C 7/208* (2013.01); *Y02P 60/23* (2015.11)

(58) Field of Classification Search
CPC ..... A01B 63/008; A01B 63/002; A01B 63/00; A01C 5/06; A01C 5/00; A01C 5/064; A01C 5/066; A01C 7/006; A01C 7/00; A01C 7/203; A01C 7/201; A01C 7/20; A01C 7/208; Y02P 60/23; Y02P 60/20; Y02P 60/00
USPC ................... 172/606; 111/14, 139, 140, 149, 111/157–169, 190–198
See application file for complete search history.

(56) References Cited

U.S. PATENT DOCUMENTS

| 3,664,279 | A | * | 5/1972 | Belden | A01C 7/06 111/187 |
| 7,861,660 | B2 | * | 1/2011 | Martin | A01C 5/06 111/140 |
| 8,794,165 | B2 | * | 8/2014 | Martin | A01C 5/06 111/140 |
| 2008/0023207 | A1 | * | 1/2008 | Lung | A01C 5/066 172/518 |

* cited by examiner

*Primary Examiner* — Christopher J Novosad (57) ABSTRACT

An adjustable row cleaner includes a row cleaner assembly that functions to clear material from the ground surface. The adjustable row cleaner includes, in one embodiment, a connector that is in mechanical communication with both a row cleaner frame, to which row cleaner wheels may be pivotally mounted, and a first end of a translator member. The translator member may pivot with respect to the row unit frame and/or row unit sub-frame about a translator member pivot. The position of a translator member second end may be manipulated, thereby adjusting the maximum depth to which the row cleaner wheels penetrate the ground surface. The adjustable row cleaner may be powered or manually adjusted, and the position of the row cleaner wheels may be monitored and automatically adjusted via a control system.

3 Claims, 9 Drawing Sheets

ADJUSTABLE ROW CLEANER

CROSS REFERENCE TO RELATED APPLICATIONS

Applicant states that this utility application is a continuation of and claims priority from U.S. patent application Ser. No. 12/955,366 filed on Nov. 29, 2010, which application was a continuation of and claimed priority from U.S. patent application Ser. No. 12/480,662 filed Jun. 8, 2009, now U.S. Pat. No. 7,861,660 issued Jan. 4, 2011, which claimed priority under §119(e) of provisional U.S. Pat. App. Ser. Nos. 61/131,192 filed on Jun. 6, 2008, and 61/135,876 filed on Jul. 24, 2008, all of which are incorporated by reference herein in their entireties.

FIELD OF THE INVENTION

The methods described herein are generally applicable to the field of agricultural equipment. The embodiments shown and described herein are more particularly for improved row cleaning for delivery of seed or fertilizer. Although in no way limiting, the present disclosure is particularly suited for minimum or no-till conditions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

U.S. Pat. No. 4,785,890 issued to Martin for "Ground-Driven Rotary Row Cleaner" illustrates prior art that may be relevant to the present disclosure, but that fails to teach the improvement disclosed and claimed herein. U.S. patents on several exemplary models of row cleaning wheels (U.S. Pat. No. 4,785,890) and closing wheels (U.S. Pat. No. 5,497,717) are incorporated by reference herein in their entirety. The operation of row planter units of the types disclosed in U.S. Pat. Nos. 4,009,668 and 6,148,747, both of which are incorporated by reference herein, is well known to those skilled in the art and not discussed in detail herein.

SUMMARY

An adjustable row cleaner is disclosed and claimed herein, without limitations, which has particular application as an improved no-till or minimum tillage planting apparatus and/or planting row unit. In one embodiment the adjustable row cleaner provides a mounting mechanism for attachment to a planter row unit allowing the depth of the row cleaner assembly to be actuated and/or adjusted automatically in response to either changes in elevation, soil conditions, foreign objects, or a command from an operator.

Most embodiments of the adjustable row cleaner typically include a row cleaner frame for mounting the row cleaner assembly to the planter row unit. The row cleaner assembly may have one or two row cleaner wheels operable to remove objects from the path of a furrow opener. The row cleaner frame may have one or two row cleaner frame arms. The row cleaner assemblies as shown herein incorporate floating row cleaner frames, which allow the row cleaner wheels to respond or react to variations in soil elevation. The adjustable row cleaner may be mounted to a tool bar for other uses in which a row unit is absent.

The adjustable row cleaner allows for a row cleaner assembly that may be actuated using an exterior system. An actuator may be used so that the depth of the row cleaner wheels may be independently adjusted with respect to the depth of other elements on a planter row unit. The adjustable row cleaner described herein also allows for depth monitoring of the row cleaner wheels. The adjustable row cleaner also allows for a mode wherein the row cleaner wheel depth may be locked in a set position and all row cleaner wheels raised or lowered to a pre-determined set-point. The method and/or structure used for actuating the depth or elevation of the row cleaner wheels may be pneumatic (i.e. air bag), hydraulic, mechanical (e.g., ball screw, spring, or rotary), or a combination thereof. The adjustable row cleaner disclosed and claimed herein also allows for a depth control and monitoring system for row cleaners wheels.

This adjustable row cleaner also allows an operator positioned in or upon a prime mover pulling a planter, typically having a tool bar with multiple planter row units mounted thereon, to monitor and control (from the prime mover) the depth at which the row cleaner wheels penetrate the soil. For example, each row cleaner assembly may have an exterior gauge or rod to provide a visual indication of depth, or variation of depth from a predetermined setting. In another embodiment, the visual indicator may be provided through either an analog or digital monitoring system displayed near the operator in the prime mover, or at another position of the planter visible to the operator when positioned in the prime mover. As agricultural equipment has grown in size, the need for a system that may be controllable from the cab of a prime mover has grown in importance. This is particularly important for changing or adjusting the depth of the row cleaner wheels on planters having in excess of sixteen rows. One embodiment of the adjustable row cleaner as described herein allows for a feedback so that as the depth varies from the pre-determined set-point, the adjustable row cleaner automatically actuates the row cleaner wheels to a lower or higher setting so that the row cleaner wheels better correspond to the set-point.

BRIEF DESCRIPTION OF THE FIGURES

In order that the advantages of the cleaning wheel will be readily understood, a more particular description of the cleaning wheel briefly described above will be rendered by reference to specific embodiments illustrated in the appended drawings. Understanding that these drawings depict only typical embodiments of the cleaning wheel and are not therefore to be considered limited of its scope, the cleaning wheel will be described and explained with additional specificity and detail through the use of the accompanying drawings.

DETAILED DESCRIPTION - LISTING OF ELEMENTS

| Element Description | Element Number |
| --- | --- |
| Adjustable row cleaner | 10 |
| Aperture | 12 |
| Planter row unit | 20 |
| Tool bar | 21 |
| Furrow opener | 22 |
| Depth regulator | 23 |
| Linkage | 26 |
| Row unit frame | 27 |
| Row unit sub-frame | 27a |
| Furrow closer | 28 |
| Row unit front plate | 29 |
| Row cleaner assembly | 30 |
| Row cleaner frame | 32 |
| Row cleaner frame arm | 32a |
| Row cleaner frame connector portion | 33 |
| Row cleaner wheel | 34 |
| Row cleaner frame pivot | 36 |
| Translator member | 40 |
| Translator member first end | 42 |
| Connector portion | 42a |
| Connector | 43 |
| Translator member second end | 44 |
| Adjustment portion | 44a |
| Translator member pivot | 46 |
| Pivot mount | 48 |
| Actuator mount | 50 |
| Lateral member | 52 |
| Actuator slot | 52a |
| Vertical member | 54 |
| Actuator engagement portion | 54a |
| Actuator | 56 |
| Translator member holder | 60 |
| Upper horizontal member | 61 |
| Lower horizontal member | 62 |
| Adjustment plate | 64 |
| Adjustment aperture | 65 |
| Translator slot | 66 |
| Cross brace | 68 |
| Translator member keeper | 70 |

DETAILED DESCRIPTION - LISTING OF ELEMENTS
-continued

| Element Description | Element Number |
| --- | --- |
| Translator member keeper sleeve | 72 |
| Translator member keeper plate | 74 |
| Adjustment tab | 76 |
| Locking pin | 77 |
| Spring | 78 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1:
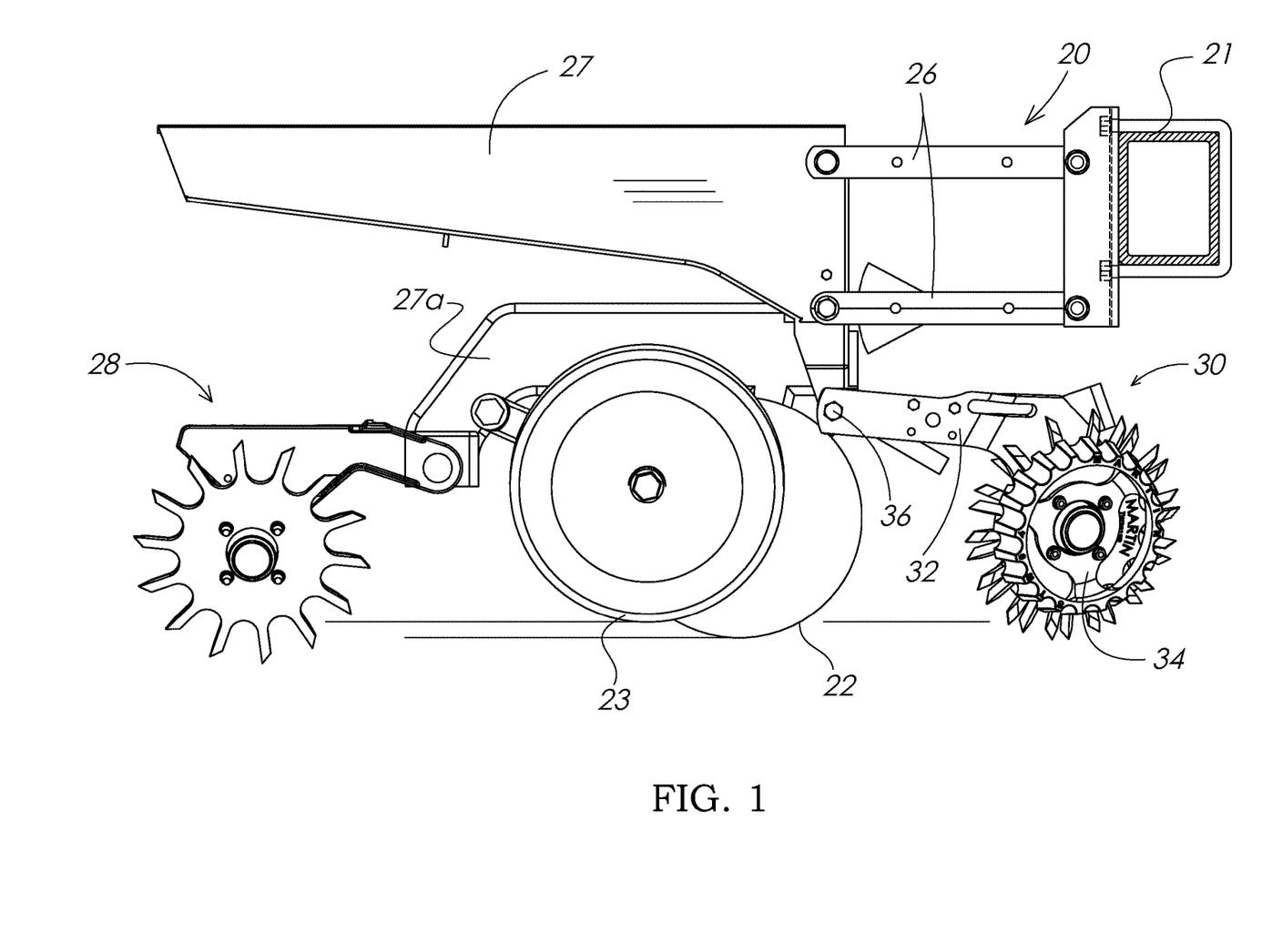
FIG. 1 illustrates a planter row unit mountable upon a tool bar as found in the prior art.

Referring now to the drawings, wherein like reference numerals designate identical or corresponding parts throughout the several views, FIG. 1 provides a side view of a prior art planter row unit 20 to which an embodiment of the adjustable row cleaner 10 may be been mounted. Planter row units 20 are generally mounted to a tool bar 21 or similar structure using linkage 26, which may be oriented in a parallel fashion as shown in FIG. 1, or which may be non-parallel in other embodiments not pictured herein.

The planter row unit 20 generally includes a row unit frame 27 and a row unit sub-frame 27a, both of which are typically pivotally affixed to the linkage 26. The row unit sub-frame 27 typically supports a furrow opener 22 that operates to open a furrow in the ground surface. Although not shown in the embodiments pictured herein, the planter row unit 20 often includes a down pressure member (not shown) for applying a biasing force to the furrow opener 22. The row unit sub-frame also supports a depth regulator 23 for regulating the depth of the furrow and a furrow closer 28 for closing the furrow.

A seed delivery mechanism (not shown) may be mounted to the row unit frame 27 and/or row unit sub-frame 27a for delivering seed to the opened furrow. The row unit frame 27 typically supports at least one container (not shown) for holding seed, fertilizer, or other material. The row unit sub-frame 27a includes a row unit front plate 29, which is oriented towards the direction of travel of the planter row unit 20. Planter row units 20 such as those shown in FIG. 1 as well as other seeding machines are well known to those practiced in the art and the operation of such will therefore not be discussed in detail herein for reasons of clarity.

Figures 2, 2A:
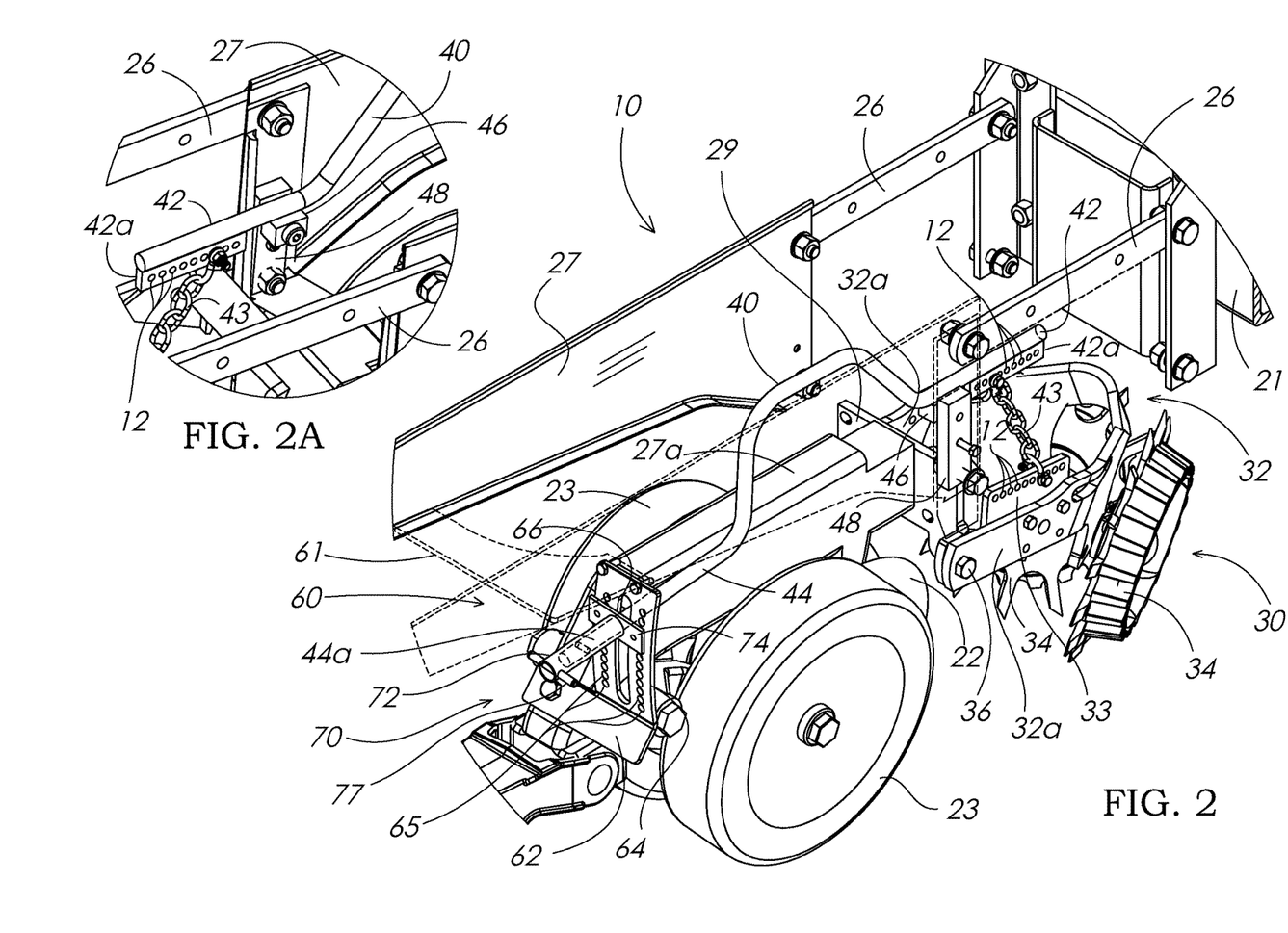
FIG. 2 provides a perspective view of a first embodiment of the adjustable row cleaner attached to a planter row unit.
FIG. 2A provides a detailed view of the translator member pivot and pivot mount of one embodiment of the adjustable row cleaner.

As shown in FIG. 2, which provides a perspective view of a first embodiment of the adjustable row cleaner 10 attached to a planter row unit, a row cleaner assembly 30 may be mounted to a planter row unit 20. The row cleaner assembly 30 as pictured herein includes a row cleaner frame 32 that is pivotally mounted to the row unit sub-frame 27a at the row unit front plate 29. The row cleaner frame 32 is pivots with respect to the planter row unit 20 about a row cleaner frame pivot 36. The row cleaner frame 32 extends forwardly from the row unit front plate 29, and a pair of row cleaner wheels 34 is pivotally affixed to the row cleaner frame 32 opposite the row cleaner frame pivot 36, which is described in more detail below. Those skilled in the art will appreciate that the row cleaner assembly 30 as disclosed may be mounted on a row unit front plate 29 through any method and/or structure known to those skilled in the art such as bolts, nuts, and corresponding apertures, chemical adhesion, clamps, welding, etc.

The row cleaner frame 32 in the first embodiment thereof is comprised of two row cleaner frame arms 32a connected to one another at the second ends thereof. The two row cleaner frame arms 32a may be oriented so that they form a line of symmetry between them in the direction of travel of the planter row unit 20. In this respect, the row cleaner frame arms 32a are shaped similar to a wishbone, or are V- or U-shaped. Each row cleaner frame arm 32a has a first and second end. The first end forms the row cleaner frame pivot 36 at the two points where the row cleaner frame arms 32a attach to the row unit front plate 29. As generally described above, the row cleaner frame arms 32a are pivotal with respect to the row unit sub-frame 27a about the row cleaner frame pivot 36 so that the row cleaner assembly is floating or semi-floating, as is known to those skilled in the art.

The row cleaner frame arms 32a come together and are attached to one another at their second ends to form one contiguous row cleaner frame 32 as shown in the embodiments pictured herein. In the embodiments pictured herein, the connection point of the two row cleaner frame arms 32a is shaped similar to an upside-down U. In other embodiments not shown herein, the connection point will be oriented differently and may have a different shape. For example, the connection point of the row cleaner frame arms 32a may be a substantially flat piece of material simply connecting the second ends of the row cleaner frame arms 32a. As those skilled in the art will appreciate, depending on the orientation of the row cleaner wheels 34 (explained in detail below) and row cleaner frame arms 32a, the connection point may have different shapes and/or orientations than the connection points pictured herein without departing from the scope of the adjustable row cleaner 10.

A row cleaner wheel 34 may be mounted at the second end of each row cleaner frame arm 32a as shown in FIG. 2. The row cleaner wheel 34 may be pivotally mounted to the row cleaner frame 32, or it may be mounted to a row cleaner wheel hub (not shown) that is either attached to or integrated into the row cleaner frame 32. The row cleaner wheel 34, row cleaner wheel hub (if so configured), and row cleaner frame arms 32a are configured so that the row cleaner wheel 34 is free to rotate about the row cleaner frame arms 32a. The operation and benefits of ground driven row cleaner wheels 34 is well known to those skilled in the art and will not be described further herein for purposes of clarity. A coulter (not shown) may be mounted between the row cleaner frame arms 32a without interference with the operation of any elements of the planter row unit 20. Other accessory tools may also be mounted between the row cleaner frame arms 32a in embodiments not pictured herein.

Row cleaner assemblies 30 having a single row cleaner wheel 34 mounted thereto may be used with the adjustable row cleaner 10 as disclosed herein without limitation. The adjustable row cleaner 10 as disclosed and claimed herein may be used with any type of floating row cleaner frame 32 and is not limited to the embodiments thereof as pictured herein. For example, the adjustable row cleaner may be used with single-arm row cleaner frames (not shown) or U-shaped row cleaner frames 32 having different orientations than the one shown in the various figures herein.

The adjustable row cleaner 10 also comprises a translator member 40 having a first end 42 and a second end 44. The translator member 40 as shown in the embodiments pictured herein spans nearly the entire length of the row unit frame 27 and is configured with various angles and angled portions such that it does not interfere with other structures and mechanisms mounted to the row unit frame 27. However, translator members 40 configured for use with other types of row planter units 20 will have different orientations with different angles and angled portions without departing from the spirit and scope of the adjustable row cleaner 10 as disclosed and claimed herein.

The translator member first end 42 may be formed as a connector portion 42a, or a connector portion 42a may be affixed to the translator member first end 42. A row cleaner frame connector portion 33 may be affixed to the row cleaner frame 32 or may be integrally formed therewith. A connector 43 may then be affixed to both the connector portion 42a and the row cleaner frame connector portion 33. Both the connector portion 42a and the row cleaner frame connector portion 30 in the first and second embodiments are formed with a plurality of apertures 12 therein to provide the operator with various places to which the connector 43 may engage the connector portion 42a. The aperture 12 with which the connector 43 is engaged affects the clearance between the row cleaner wheels 34 and the ground surface as explained in more detail below. As shown in the first and second embodiments, the connector 43 may be a chain. However, in other embodiments not pictured herein, the connector 43 may be a cable, rope, bar, rod, tine, or any other structure that serves to connect the connector portion 42a of the translator member to the row cleaner frame connector portion 33. Consequently, the connector portion 42a and row cleaner frame connector portion 33 may vary in structure from those shown herein and still provide the operator with adequate adjustability. For example, the connector portion 42a and row cleaner frame connector portion 33 may include slots for engagement with the connector 43 wherein the position of the connector 43 within the slot may be fixed through structure and/or methods known to those skilled in the art (e.g., clamps, screws, etc.).

In the first and second embodiments, a translator member pivot 46 may be positioned between the translator member first and second ends 42, 44. A detailed view of the translator member pivot 46 and pivot mount 48 are shown in FIG. 2A. The translator member pivot 46 pivots with respect to the row unit frame 27 and may be affixed to the translator member 40. A pivot mount 48 may be affixed to the row unit frame 27 to support the translator member pivot 46. The pivot mount 48 may be affixed to the row unit frame 27 via any structure and/or method known to those skilled in the art such as nuts, bolts, and corresponding apertures, clamps, chemical adhesion, welds, etc.

Figure 3A:
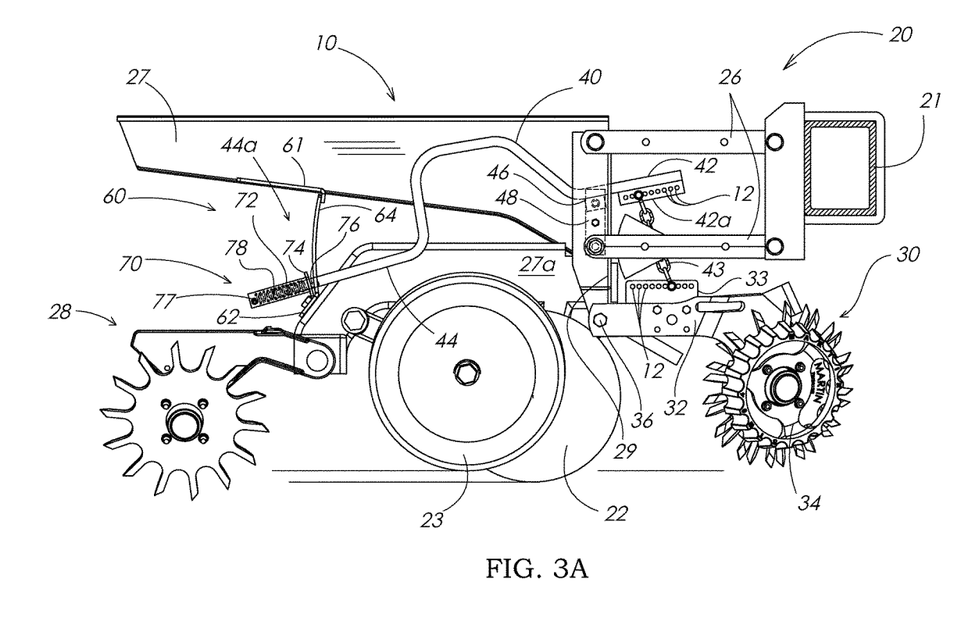
FIG. 3A provides a side view of the first embodiment of the adjustable row cleaner attached to a planter row unit wherein the row cleaner wheels are set to a high setting.
Figure 3B:
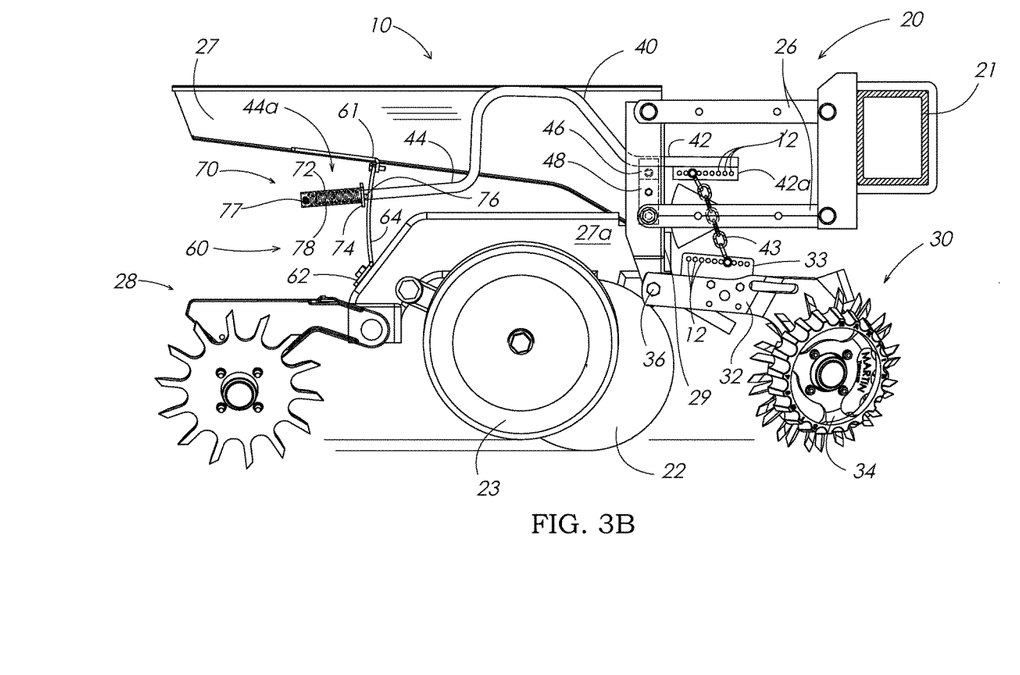
FIG. 3B provides a side view of the first embodiment of the adjustable row cleaner attached to a planter row unit wherein the row cleaner wheels are set to a low setting.
Figure 4:
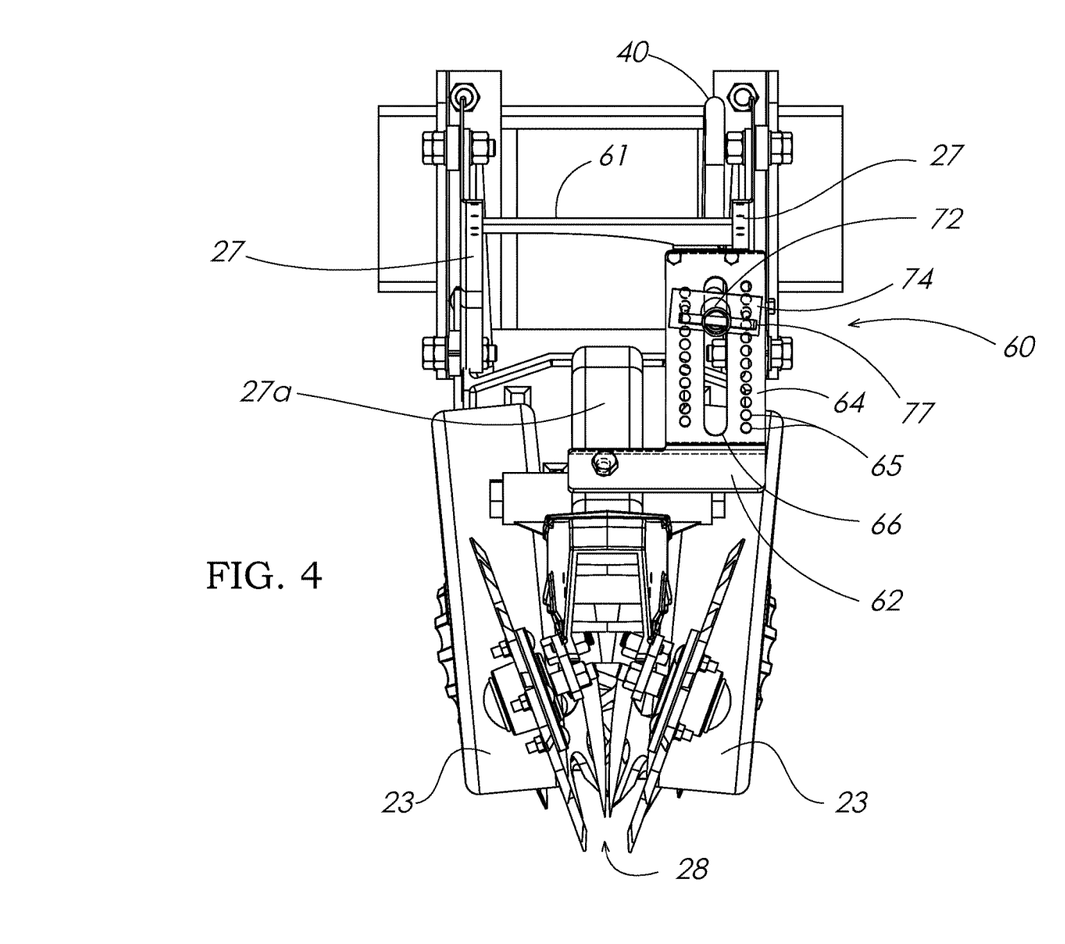
FIG. 4 provides a detailed rear view of the first embodiment of the adjustable row cleaner attached to a planter row unit.

In the first embodiment of the adjustable row cleaner as shown in FIGS. 2-4, the adjustment portion 44a may be engaged with a translator member holder 60. In the first embodiment the translator member holder 60 is comprised of an upper horizontal member 61 affixed to the row unit frame 27, lower horizontal member 62 affixed to the row unit sub-frame 27a, and a adjustment plate 64 positioned between and affixed to both the upper and lower horizontal members 61, 62. The upper horizontal member 61, lower horizontal member 62, and adjustment plate 64 may be formed as separate elements affixed to one another using any method and/or structure known to those skilled in the art such as nuts, bolts, and corresponding apertures, clamps, chemical adhesion, welds, etc. Alternatively, the upper horizontal member 61, lower horizontal member 62, and/or adjustment plate 64 may be integrally formed with one another.

The adjustment plate 64 in the first embodiment, which is best shown in FIG. 4, includes a plurality of adjustment apertures 65 positioned on either side of a translator slot 66. A predetermined length of the adjustment portion 44*a* passes through the translator slot 66 as shown in FIGS. 3A and 3B. The adjustable row cleaner 10 may have one or more rows of adjustment apertures 65 on the adjustment plate 64, and each row may have two or more adjustment apertures 65.

A translator member keeper 70 is positioned over part of the adjustment portion 44*a* of the translator member 40 in the first embodiment. The translator member keeper 70 includes a translator member keeper sleeve 72 that is formed as a cylinder in the first embodiment and which directly engages the adjustment portion 44*a*. A translator member keeper plate 74 may be affixed to the translator member keeper sleeve 72 at the proximal end thereof so that the translator member keeper plate 74 may engage the adjustment plate 64.

The translator member keeper plate 74 may be formed with at least one adjustment tab 76 therein, although the first embodiment includes two adjustment tabs 76. The adjustment tabs 76 are oriented to engage the adjustment apertures 65, thereby fixing the position of the translator member with respect to the adjustment plate 64 (and consequently with respect to the row cleaner frame 27) when at least one adjustment tab 76 is positioned within and engaged with one adjustment aperture 65.

An aperture 12 may be formed in the distal end of the translator member keeper sleeve 72 so that a locking pin 77 may be engaged with the translator member keeper 70. A spring 78 may be positioned between the locking pin 77 and distal end of the adjustment portion 44*a* within the translator member keeper sleeve 72 to bias the periphery of the locking pin 77 against the edges of the aperture 12 formed in the translator member keeper sleeve 72 so that the locking pin 77 does not become inadvertently dislodged from the translator member keeper sleeve 72.

When the operator desires to change the vertical clearance between the row cleaner wheels 34 and the ground surface, the operator may first remove the locking pin 77 from the translator member keeper sleeve 72. At this point, the translator member keeper plate 74 may be moved away from the adjustment plate 64 so that the adjustment tabs 76 may be disengaged with the adjustment apertures 65. When no adjustment tabs 76 are engaged with adjustment apertures 65, the adjustment portion 44*a* of the translator member 40 may move relative to the adjustment plate 64 in the vertical dimension between the limits of the translator slot 66.

The first embodiment of the adjustable row cleaner 10 with the row cleaner wheels 34 set to the maximum clearance between the row cleaner wheels 34 and the ground surface (i.e., the highest setting for the row cleaner wheels 34) is shown in FIG. 3A. The row cleaner wheels 34 set to the minimum clearance between the row cleaner wheels 34 and the ground surface (i.e., the lowest setting for the row cleaner wheels 34) is shown in FIG. 3B. It should be noted that the maximum and minimum clearance between the row cleaner wheels 34 and ground surface is not only dictated by the position of the translator member 40 but also by the position of the connector on the row cleaner frame connector portion 33 and/or on the connector portion 42*a* of the translator member 40.

Raising the adjustment portion 44*a* causes the translator member 40 to pivot about the translator member pivot 46, which lowers the connector portion 42*a* and consequently allows the row cleaner frame 32 to pivot downward by a greater amount. When the adjustment portion 44*a* is positioned so that the maximum downward position of the row cleaner frame 32 is that desired by the operator, the vertical position of the adjustment portion 44*a* with respect to the adjustment plate 64 may be locked. This is accomplished by engaging an adjustment tab 76 with an adjustment aperture 65. Positioning the locking pin 77 through the aperture 12 in the translator member keeper sleeve 72 will secure the engagement between the adjustment tab 76 and the adjustment aperture 65.

In other embodiments not pictured herein, the adjustment plate 64 may include more adjustment apertures 65 with different spacing than those shown in the embodiments pictured herein, or it may include fewer adjustment apertures 65 with different spacing. As shown, the adjustable row cleaner 10 in FIGS. 2-4 allows for adjustment of the row cleaner wheels 34 of four inches in the vertical dimension, wherein the lowest setting allows the row cleaner wheels 34 to penetrate the ground surface to a depth of one inch above the furrow depth. Accordingly, the highest (i.e., shallowest) setting allows the row cleaner wheels 34 to penetrate the ground surface to a depth of five inches above the furrow depth. However, other embodiments may have different extremes of adjustment as well as a larger overall range of adjustment. For example, simply lengthening or shortening the connector 43 affects the minimum and maximum clearance of the cleaner wheels 34 from the ground surface, which may also be affected by including more or fewer adjustment apertures 65 in the adjustment plate 64. Furthermore, the specific location on the row cleaner frame connector portion 33 and/or connector portion 42*a* of the translator member 40 to which the connector 43 is attached also affect the minimum and maximum clearance for the cleaner wheels 34.

Figure 5:
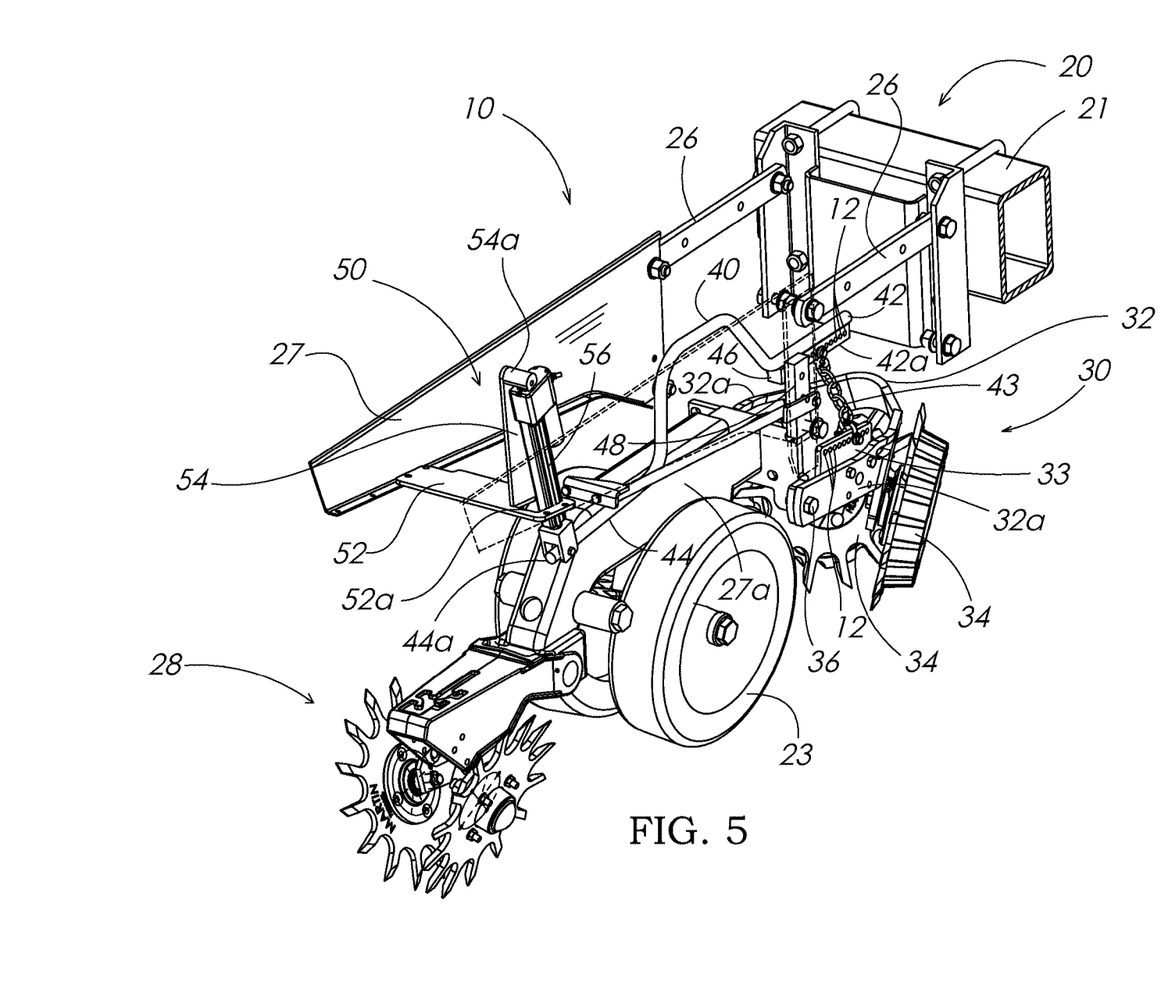
FIG. 5 provides a perspective view of a second embodiment of the adjustable row cleaner attached to a planter row unit.
Figure 6:
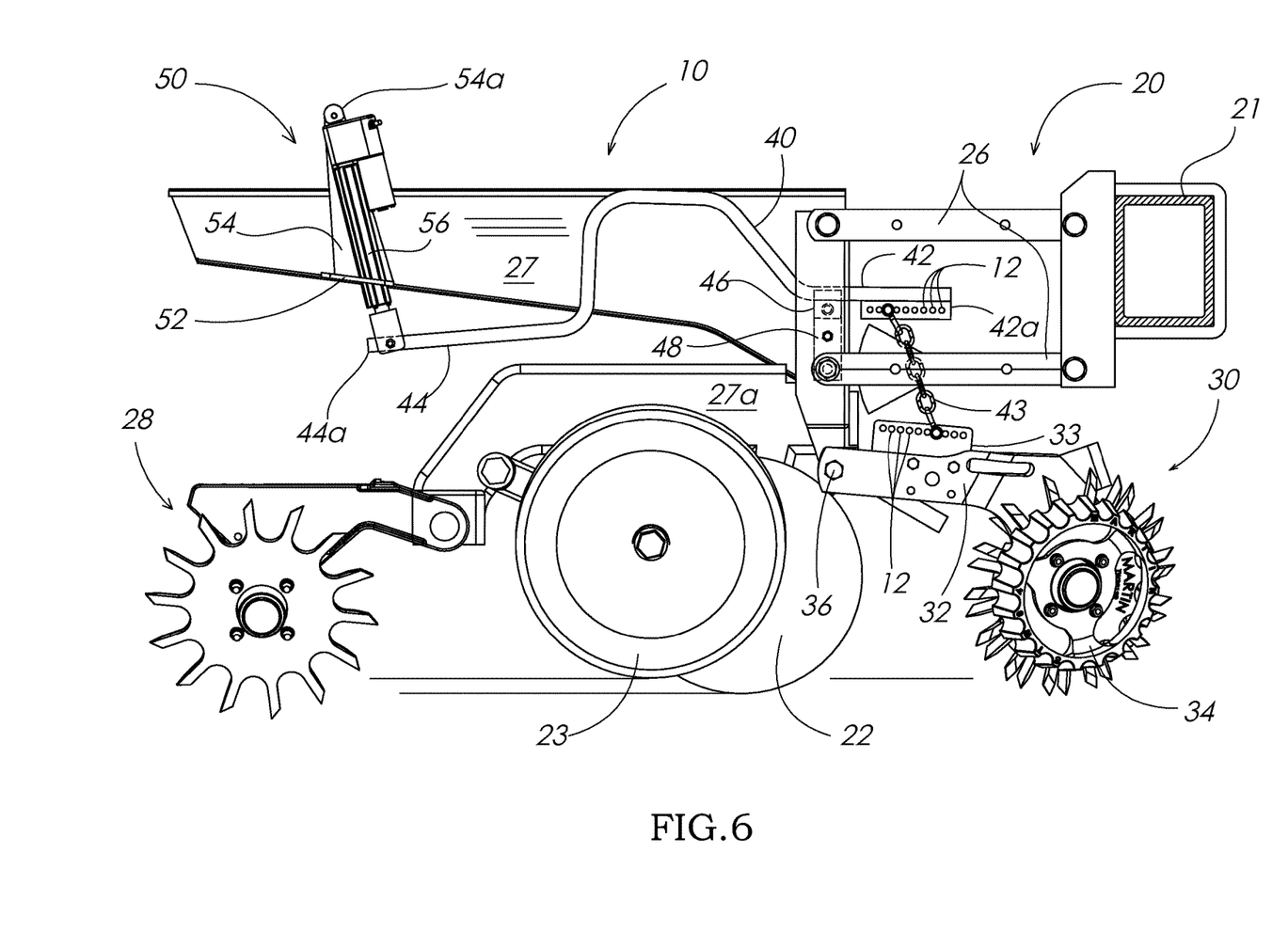
FIG. 6 provides a side view of the second embodiment of the adjustable row cleaner attached to a planter row unit.
Figure 7:
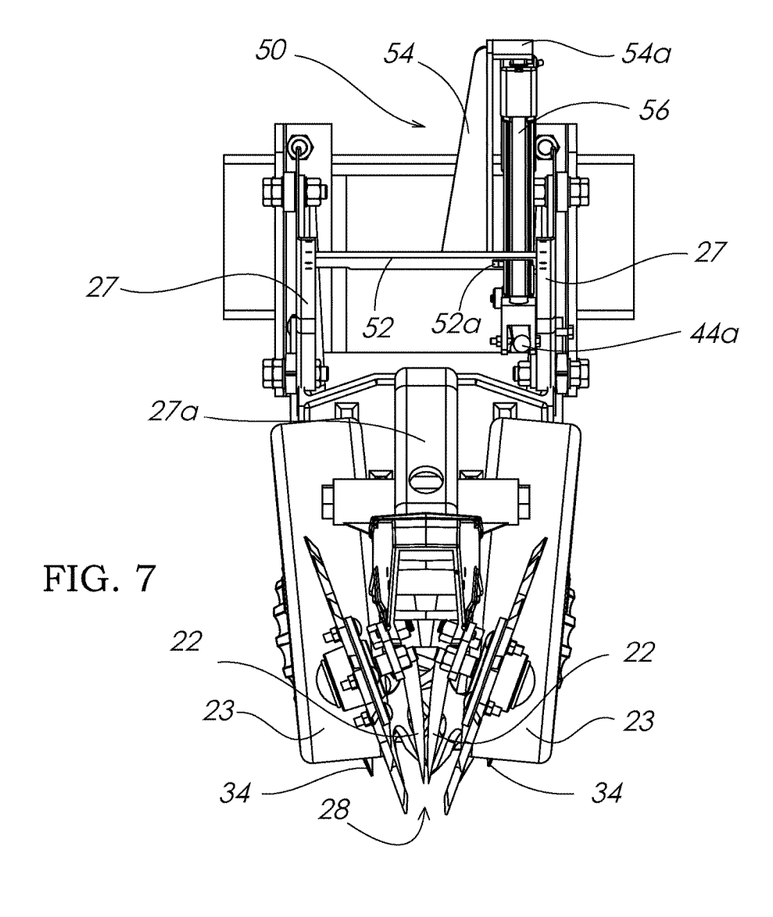
FIG. 7 provides a detailed rear view of the second embodiment of the adjustable row cleaner attached to a planter row unit.

A second embodiment of the adjustable row cleaner 10 is shown in FIGS. 5-7. In the second embodiment, the adjustment portion 44*a* of the translator member 40 is coupled to an actuator 56. Any type of actuator 56 may be used with the adjustable row cleaner 10, such as hydraulic, pneumatic, mechanical, or combinations thereof without limitation. An actuator mount 50 is affixed to the row cleaner frame 32. The actuator mount 50 in the second embodiment includes a lateral member 52 having an actuator slot 52*a* formed therein. Affixed to the lateral member 52 is a vertical member 54. A first end of the vertical member 54 directly interfaces the lateral member 52 and a second end of the vertical member 54 may be formed as an actuator engagement portion 54*a*.

An actuator 56 may be pivotally coupled to the actuator engagement portion 54*a* at a first end of the actuator 56, and a second end of the actuator 56 may be pivotally coupled to the adjustment portion 44*a* of the translator member 40. As is apparent to those skilled in the art in light of FIG. 7, as the actuator 56 is extended, the first end of the actuator 56 acts upon the actuator engagement portion 54*a*, which is rigidly mounted in the second embodiment. Accordingly, extension of the actuator 56 causes the adjustment portion 44*a* to lower. This in turn causes the connector portion 42 to lift and increases the clearance between the row cleaner wheels 34 and the ground surface through the action of the connector 43 and translator member pivot 46 as previously described.

Accordingly, the position of the actuator 56 determines the position of the adjustment portion 44a, and accordingly, the depth setting of the row cleaner wheels 34. Because of the configuration of the translator member 40 and the inherent spring characteristics thereof, a rigid or semi-rigid connector 43 may be used with an embodiment employing an actuator 56 without premature failure of the actuator 56 caused by mechanical forces imparted thereto from the row cleaner wheels 34. To achieve the desired resiliency, the translator member 40 may be constructed of any material that is sufficiently rigid and yet sufficiently flexible to absorb the desired amount of mechanical forces imparted thereto. Such materials include various grades of carbon steel, polymers, aluminum, wood, carbon-based woven fiber materials, aluminum, aluminum alloys, or combinations thereof.

Figure 8:
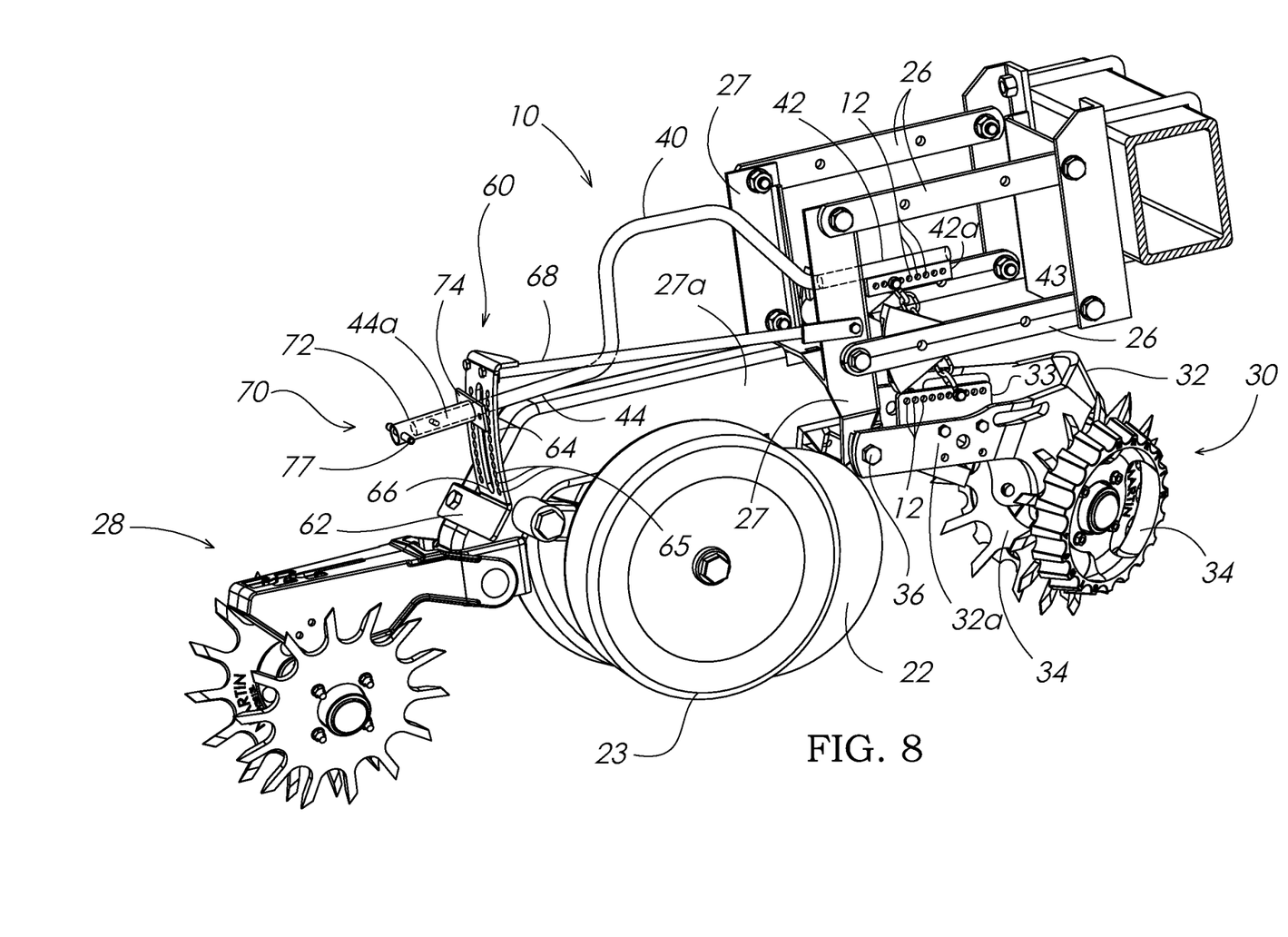
FIG. 8 provides a perspective view of a third embodiment of the adjustable row cleaner attached to a planter row unit.

A third embodiment of the adjustable row cleaner 10 is shown in FIG. 8. The third embodiment is similar to the second embodiment as shown in FIGS. 2-4. In the third embodiment, a cross brace 68 is provided to strengthen the adjustment plate 64 and to provide an attachment point for the top portion of the adjustment plate 64. It is contemplated that the adjustable row cleaner 10 as shown in FIG. 8 will be especially useful in conjunction with row planter units 20 that do not have individual material containers (not shown) mounted upon each planter row unit 20. In such systems, a central container (not shown) is typically used to supply material to each planter row unit 20 of a contiguous planter having multiple planter row units 20 attached thereto.

The embodiments pictured herein show the connector 43 engaging a row cleaner frame connector portion 33 affixed to only one row cleaner frame arm 32a. However, in other embodiments it may engage row cleaner frame connector portions 33 on both row cleaner frame arms 34 or one row cleaner frame connector portion 33 affixed to both row cleaner frame arms 32a without departing from the scope of the adjustable row cleaner 10. Additionally, the adjustable row cleaner 10 described herein may be used with only one row cleaner wheel 34 mounted to a row cleaner frame 32 having the ability to support two row cleaner wheels 34. The adjustable row cleaner 10 also may be used with row cleaner frames 32 having only one row cleaner frame arm 32a and either one or two row cleaner wheels 34. In such an embodiment the connector 43 would simply engage the one row cleaner frame arm 32a of the row cleaner assembly 30.

Those of ordinary skill in the art will appreciate that the adjustable row cleaner 10 reduces residue plugging during operation and allows relatively narrow spacing between each of the two row cleaner wheels 34 of the row cleaner assembly 30 as well as relatively narrow spacing between adjacent planter row units 20.

When the row cleaner wheel 34 of a row cleaner assembly 30 such as that pictured herein (typically referred to as a "floating row cleaner") strikes an obstruction of sufficient resistance, the row cleaner assembly 30 allows the row cleaner wheel 34 to traverse the obstruction by climbing over it. The adjustable row cleaner 10 does not interfere with this action. As the row cleaner wheel 34 rises, the connector 43 slackens and the row cleaner frame 32 pivots about the row cleaner frame pivot 36 as in floating row cleaners of the prior art. However, if a rigid or semi-rigid connector 43 is used, the shape of the handle translator member 40 provides a spring bias for the row cleaner frame 32. In such an embodiment, the spring tension from the configuration of the translator member 40 allows the translator member 40 to absorb vertical motion of the row cleaner wheels 34 caused by bumps and obstructions.

As best shown in FIGS. 2 and 5, the pair of row cleaner wheels 34 may be angled from the vertical axis. The vertical angle depicted by the embodiment in FIGS. 2-7 is approximately twenty three degrees from vertical on each side, or a total of forty six degrees between the row cleaner wheels 34. The row cleaner assembly 30 may be configured in other combined vertical angle configurations in the range of zero to ninety degrees. Accordingly, the row cleaner assembly 30 also may be produced with an angle of less than forty six degrees from vertical for less aggressive row cleaning.

As shown in the various embodiments pictured herein, each row cleaner wheel 34 is symmetrical to the other row cleaner wheel 34 about the direction of travel. Furthermore, each row cleaner wheel 34 in the embodiments pictured herein is also comprised of a plurality of non-equal diameters to reduce the amount of trash cleared by each row cleaner wheel 34 and to maintain depth control of each row cleaner wheel 34. The row cleaner frame 32 configuration and pivotal mount to the row unit sub-frame 27a allows the pair of larger diameter row cleaner wheels 34 to float while the smaller diameter row cleaner wheels 34 restrict the depth of penetration of the larger diameter row cleaner wheel 34, as is well known to those skilled in the art. The adjustable row cleaner 10 may also be used with row cleaner assemblies 30 employing row cleaner wheels 34 having only one diameter.

As is clear from the second embodiment, the adjustable row cleaner 10 may be integrated with a row cleaner assembly 10 in such a way that that the position of the row cleaner wheels 34 may be adjusted remotely, such as from the operator's position in the prime mover (not shown) during use. The adjustable row cleaner 10 described herein also allows for depth monitoring of the row cleaner wheels 34 through a variety of depth indicators. Monitoring and subsequently indicating the engagement of the row cleaner wheels 34 with the ground surface may be accomplished through many different methods and/or structures. For example, in one embodiment a tension sensor (not shown) is positioned on the connector 43 so that when the tension sensor detects slack in the connector 43, the operator is alerted, as slack in the connector 43 would indicate that the row cleaner wheels 34 are not penetrating the ground surface to the desired depth.

Furthermore, any embodiment of the adjustable row cleaner 10 may be incorporated with the setting indicator (not shown). The setting indicator may be configured to indicate the set depth of the row cleaner wheels 34. For example, in one embodiment of the adjustable row cleaner 10 with a setting indicator, the setting indicator is comprised of a display module positioned adjacent the operator in the prime mover, and a sensor at each adjustable row cleaner 10. The display functions to show the depth setting for each adjustable row cleaner 10 through a visual readout. In another embodiment, the setting indicator is comprised of a bar and gauge placed on each adjustable row cleaner 10 with a plurality of increments thereon that correspond to different penetration depths of the row cleaner wheels 34.

The adjustable row cleaner 10 also allows for a mode wherein the depth of the row cleaner wheel 34 may be locked in a set position and all row cleaner wheels 34 raised or lowered to a pre-determined set-point. Those skilled in the art may refer to this type of embodiment as ganging multiple row cleaner assemblies 30 and/or adjustable row cleaners 10 to one another. In the second embodiment of the adjustable row cleaner 10 as pictured herein, this ganging may be achieved by simply connecting the translator member second ends 44 of adjacent adjustable row cleaners 10 to one another with a horizontal connecting unit (not shown), which may be a rod, bar, plate, or any other suitable structure known to those skilled in the art. Accordingly, in a ganged embodiment, fewer actuators 56 may be required to adjust the penetration depth of the row cleaner wheels 34 as only each gang of adjustable row cleaners 10 would require an actuator 56 as opposed to each separate adjustable row cleaner 10 requiring an actuator 56.

The type of indication the adjustable row cleaner 10 provides to the operator to indicate the depth of the row cleaner wheels 34 may vary from one embodiment to the next. For example, in one embodiment each row cleaner assembly 30 may have an exterior gauge or rod (not shown) to provide a visual indication of depth, or variation of depth from a predetermined setting, which exterior gauge or rod is visible to the operator from the prime mover. In another embodiment, the visual indicator may be provided through either an analog or digital monitoring system (not shown) displayed near the operator in the prime mover, or at another position of the planter visible to the operator when positioned in the prime mover. Such a digital monitoring system may include separate indicators on each row cleaner assembly 30 or on each gang of row cleaner assemblies 30. Such a digital monitoring system may also include a programmable logic circuit (PLC) to automatically adjust the penetration depth of the row cleaner wheels 34 based on a depth monitoring system based on both inputs to the PLC from the operator and/or depth monitoring system for the row cleaner wheels 34 and/or outputs from the PLC to the actuators 56. Accordingly, as the depth of the row cleaner wheels 34 varies from the pre-determined set-point, the adjustable row cleaner 10 automatically adjusts the row cleaner wheels 34 to a lower or higher setting by controlling the associated actuators 56 so that the row cleaner wheels 34 better correspond to the set-point.

The adjustable row cleaner 10 may also be used with other accessory items. For example, U.S. Pat. No. 7,360,495 entitled "Apparatus for Planter Depth Monitoring," which is incorporated by reference herein in its entirety, discloses an apparatus to determine if the furrow opening device is penetrating the ground surface to the desired depth. The apparatus and concepts disclosed in that patent application are fully applicable to the adjustable row cleaner 10 disclosed herein to determine when the row cleaner wheels 34 are penetrating the organic matter and/or soil to the desired depth.

As is obvious to those of ordinary skill in the art, the adjustable row cleaner 10 may be configured for use and operation adjacent a plurality of adjustable row cleaners 10 attached to a plurality of corresponding planter row units 20 attached to a tool bar 21 to form a contiguous planter unit (not shown). To modify the amount of organic material cleared from each row, the row cleaner wheels 34 may be angled or positioned differently. For example, if the row cleaner wheels 34 are configured to intersectedly engage one another during use the row cleaner wheels 34 will remove relatively large amount of organic material. The row cleaner wheels 34 may also be configured to non-intersectedly engage one another for relatively less trash clearing.

It should be noted that the present invention is not limited to the specific embodiments pictured and described herein, but is intended to apply to all similar apparatuses for adjusting the penetration depth of ground engaging implements, such as row cleaner wheels 12. Accordingly, modifications and alterations from the described embodiments will occur to those skilled in the art without departure from the spirit and scope of the present invention.

What is claimed is:

1. A method of adjusting the height of a row cleaner frame, wherein said row cleaner frame is pivotally mountable to a planter row unit, said method comprising the steps of:
   a. pivotally mounting a translator member to said planter row unit about a fulcrum positioned between a first and second end of said translator member;
   b. engaging said first end of said translator member with said row cleaner frame;
   c. securing a first end of an actuator to said planter row unit; and,
   d. engaging said second end of said translator member with a second end of said actuator, such that extending said actuator causes said second end of said translator member to be lowered, which in turn causes said row cleaner frame to rise.

2. The method according to claim 1 wherein said first end of said translator member is engaged with said row cleaner frame via a connector.

3. The method according to claim 2 wherein said connector is further defined as a link chain.

* * * * *